Patented July 4, 1944

2,352,698

UNITED STATES PATENT OFFICE 2,352,698

PROCESS OF PREPARING A SULPHONATED PRODUCT

James T. Eaton, Wyncote, and Peter W. Volk, Philadelphia, Pa., assignors to E. F. Houghton and Co., Philadelphia, Pa., a corporation of Pennsylvania No Drawing. Application May 29, 1940, Serial No. 337,952

6 Claims. (Cl. 252—354)

The present invention relates to a novel sulphonation product and to the method of preparing the same, and more particularly it relates to a sulphonated product obtained by sulphonating a mixture of a monohydric alcohol having from one to eight carbon atoms and an unsaturated fat or fatty acid.

One object of the present invention is to provide a sulphonated product of the stated type which possesses superior properties as a wetting-out and a penetrating agent, a scouring and dyeing assistant, an emulsifying agent for mineral oil, fatty oils and waxes, and a softener for textiles and leather.

Another object of the present invention is to provide a sulphonated product of the type described which may be blended with the usual sulphonated oils, fatty oils, and mineral oils, to impart thereto improved wetting-out and emulsifying properties.

Still another object of the present invention is to provide a product characterized by unusually high sulphonation as compared to conventional sulphonated fatty oils.

A further object of the present invention is to furnish an economical method by which the sulphonated products of the invention may be easily prepared and by which products of uniform desired properties result upon repetition of the process, as opposed to methods now in use where the properties of the products obtained vary from batch to batch.

Other objects will be apparent from a consideration of the specification and claims.

The sulphonation product of the present invention is obtained by sulphonating a mixture of a monohydric alcohol having from one to eight carbon atoms and an unsaturated fat or fatty acid.

The term "sulphonation" and the like used in this specification and claims is to be understood as describing the process of treating a material with sulphuric acid or an equivalent agent to produce predominantly sulphuric acid esters, and the use of this, and like terms does not imply the production of significant amounts of sulphonic acids. These terms are used herein in the general sense in which they are used in the production of sulphonated oils.

The monohydric alcohol employed may be any of the alcohols from methyl through octyl, and of these ethyl, n-butyl, isobutyl or the amyl alcohols are preferred. Furthermore, the monohydric alcohol may contain atoms other than carbon in the alcohol chain, as, for example oxygen (an ether linkage), and thus the monohydric glycol ethers, such as glycol monoethyl or monobutyl ether, are available for use, and are included within the term "monohydric alcohol."

The unsaturated fat applicable for use may be derived from any source, and may be a natural or a synthetic product. The term "unsaturated" includes the unsaturated hydroxy compounds. If a natural product is employed, the fat is usually a vegetable or animal oil. The preferred fats are those which are rich in either triolein or triricinolein, the former compound being a triglyceride of an unsaturated fatty acid, and the latter a triglyceride of an unsaturated hydroxy fatty acid. The triglycerides, such as olive oil, teaseed oil, peanut oil, corn oil, soya bean oil, castor oil, cottonseed oil, whale oil, neat's-foot oil, lard oil, and the like are particularly advantageous for use. In place of the fats themselves, unsaturated or unsaturated hydroxy fatty acids, such as the acids derived from the listed oils or other products containing olein or ricinolein, may be used in the production of the sulphonated product. In place of the oils rich in triolein or triricinolein or of oleic or ricinoleic acid, other unsaturated oils or fatty acids may be employed. Oils rich in trilinolein and trilinolenin may be used, such as linseed and rape-seed oils. Linoleic or linolenic acid are also available for use.

Mixtures of any of the unsaturated fatty materials with mixtures of any of the monohydric alcohols may be used, and the mixture sulphonated may also contain other fats or fatty acids, such as saturated fats or fatty acids.

The process of the present invention is characterized by sulphonating the monohydric alcohol-fat (or fatty acid) mixture at two temperature levels; the initial sulphonation being carried out at a relatively high temperature, and the sulphonation being completed at a lower temperature. The relatively high temperature range is from about 56° C. to 120° C., and the lower temperature range from about 55° C. to —10° C., it being understood that in any particular process, there is a marked difference, in general for example at least a 20° difference, between the temperature of the initial sulphonation and the temperature at which the sulphonation is completed. The preferred range for the higher temperature is from 65° C. to 120° C., more specifically from 70° C. to 100° C. and for the lower temperature from 45° C. to —10° C., more specifically from 35° C. to 0° C.

Concentrated sulphuric acid (90% or more $H_2SO_4$), oleum, or any other material capable of producing $SO_3$ in sufficient quantities to sulphonate the monohydric alcohol-fat mixture may be used. The sulphonation may be accomplished in a relatively short time, for example, the two heating steps may each require only a few minutes; or the process may be extended over an appreciable time, for example twelve hours or more, the time required for sulphonation in general depending upon the type of equipment used and the refrigeration and heating facilities available. The amount of sulphonating agent employed depends on the concentration thereof, the nature of the mixture sulphonated, and the degree of sulphonation desired, and will be determined in any particular case by these factors. Preferably, the sulphonation agent is concentrated sulphuric acid assaying 92% to 100% as $H_2SO_4$. The amount of sulphonating agent used in the initial sulphonation at the high temperature may vary from as little as 2% of the oil weight to as much as 20% of the oil weight without materially affecting the properties of the final product, depending in general upon temperatures chosen for the initial step in the process. The total amount of acid used in both sulphonation steps may vary from 25% to 200% based on the oil weight. The order of addition of the monohydric alcohol, the fat or fatty acid, and the sulphonating agent is also immaterial. The sulphonation in either step may, if desired, be carried out in the presence of a solvent or diluent for the mixture, such as acetic acid, chlorinated hydrocarbons, petroleum hydrocarbon, aromatic hydrocarbons, ethers, ketones, and the like.

The mol ratio of monohydric alcohol to fat or fatty acid may vary widely depending upon the product desired and the process of sulphonation employed. In general, the molecular ratio of monohydric alcohol to fatty acid will be between 1 to 3 and 4 to 1 and of monohydric alcohol to fat between 1 to 1 and 12 to 1. Preferably, the range for the alcohol-fatty acid ratio is from .75 to 1 to 1.5 to 1 and in the case of fat from 2 to 1 to 4.5 to 1.

The process of the present invention is, in effect, the reverse of ordinary sulphonation practices, where the high temperature is usually reached at the end of the sulphonation. Furthermore, the highest temperature used in such processes is rarely above 50° C. By proceeding in accordance with the process herein disclosed, products of uniform properties are obtained upon repetition of the process; whereas in previous sulphonation procedures, products which lack uniform properties from batch to batch result and an unsatisfactory reaction from a practical standpoint is obtained. From a chemical viewpoint, the products of the present invention are characterized by unusually high sulphonation. By the present invention, it is possible to obtain sulphonated products containing upwards of 15 per cent. or more of combined $SO_3$, calculated on a dry basis, a figure considerably higher than that obtained by the conventional sulphonation of a fatty oil.

The products produced by the present invention are available for use as excellent wetting-out and penetrating agents, and scouring and dyeing assistants. They are also of value as emulsifying agents for mineral oil, fatty oils, and waxes, and are useful as softeners for textile goods and leather. The products of the invention 1 ay be blended with ordinary sulphonated oil, fatty oils, or mineral oils, and will impart improved wetting-out and emulsifying properties thereto.

The following example is illustrative of the production of a sulphonated product in accordance with the present invention:

1,000 pounds of olive oil and 300 pounds of N-amyl alcohol are heated to 80° C., at which temperature 100 pounds of 66° Bé. sulphuric acid are slowly added over a period of 30 to 120 minutes. The mixture is then cooled to 15°–20° C. and the sulphonation finished with 400–1,000 pounds of 66° Bé. sulphuric acid at this temperature. After a suitable period of sulphonation, for example one hour, the sulphonation mix is washed and neutralized, or vice versa, according to any one of the many available methods well known to those skilled in the art of manufacturing sulphonated oils. The method by which the sulphonated oil is finished is immaterial so far as this invention is concerned.

Considerable modification is possible in the selection of the monohydric alcohol, the fat, or fatty acid employed, as well as in the steps and the physical factors of the process, without departing from the essential features of the invention.

We claim:

1. The process of preparing a sulphonated product which comprises partially sulphonating a mixture of a monohydric alcohol containing from 1 to 8 carbon atoms and a compound selected from the group consisting of an unsaturated fat in a mol ratio to the monohydric alcohol of between 1 to 1 and 1 to 12 and an unsaturated fatty acid in a mol ratio to the monohydric alcohol of between 3 to 1 and 1 to 4, at a temperature between 56° C. and 120° C., and thereafter further sulphonating the product at a temperature between −10° C. and 55° C., there being a difference of at least about 20° C. in the temperature between that of the initial sulphonation step and that of the further sulphonation step.

2. The process of preparing a sulphonated product which comprises adding a sulphonating agent to a mixture of a monohydric alcohol containing from 1 to 8 carbon atoms and a compound selected from the group consisting of an unsaturated fat in a mol ratio to the monohydric alcohol of between 1 to 1 and 1 to 12 and an unsaturated fatty acid in a mol ratio to the monohydric alcohol of between 3 to 1 and 1 to 4, the amount of sulphonating agent being insufficient to sulphonate the said mixture completely, heating the mixture and sulphonating agent at a temperature between 65° C. and 120° C., adding to the partially sulphonated product at −10° C. to 45° C. sufficient sulphonating agent to complete the sulphonation, and thereafter completing the sulphonation at said temperature.

3. The process of preparing a sulphonated product which comprises adding a sulphonating agent to a mixture of a monohydric alcohol containing from 1 to 8 carbon atoms and an unsaturated fat, the mol ratio of monohydric alcohol to unsaturated fat being between 1 to 1 and 12 to 1, the amount of sulphonating agent being insufficient to sulphonate the said mixture completely, heating the mixture and sulphonating agent at a temperature between 70° C. and 120° C., adding to the partially sulphonated product at 0° C. to 35° C. sufficient sulphonating agent to complete the sulphonation, and thereafter completing the sulphonation at said temperature.

4. The process of preparing a sulphonated product which comprises adding a sulphonating agent to a mixture of a monohydric alcohol containing from 1 to 8 carbon atoms and an unsaturated fatty acid, the mol ratio of monohydric alcohol to unsaturated fatty acid being between 1 to 3 and 4 to 1, the amount of sulphonating agent being insufficient to sulphonate the said mixture completely, heating the mixture and sulphonating agent at a temperature between 70° C. and 120° C., adding to the partially sulphonated product at 0° C. to 35° C. sufficient sulphonating agent to complete the sulphonation, and thereafter completing the sulphonation at said temperature.

5. The process of claim 3 wherein the unsaturated fat is an oil comprising chiefly triolein, and wherein the mol ratio of monohydric alcohol to unsaturated fat is between 2 to 1 and 4.5 to 1.

6. The process of claim 4 wherein the unsaturated fatty acid is chiefly oleic acid, and wherein the mol ratio of monohydric alcohol to unsaturated fatty acid is between .75 to 1 and 1.5 to 1.

JAMES T. EATON.
PETER W. VOLK.